(12) United States Patent
Warren et al.

(10) Patent No.: US 11,047,717 B2
(45) Date of Patent: Jun. 29, 2021

(54) SYSTEM AND METHOD FOR DETERMINING SLURRY SAND CONCENTRATION AND CONTINUOUS CALIBRATION OF METERING MECHANISMS FOR TRANSFERRING SAME

(71) Applicant: Halliburton Energy Services, Inc., Houston, TX (US)

(72) Inventors: Wesley John Warren, Marlow, OK (US); Bryan John Lewis, Duncan, OK (US); Tim H. Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/770,408

(22) PCT Filed: Dec. 22, 2015

(86) PCT No.: PCT/US2015/067520
§ 371 (c)(1),
(2) Date: Apr. 23, 2018

(87) PCT Pub. No.: WO2017/111968
PCT Pub. Date: Jun. 29, 2017

(65) Prior Publication Data
US 2018/0313677 A1    Nov. 1, 2018

(51) Int. Cl.
*G01F 1/00* (2006.01)
*E21B 43/267* (2006.01)
*E21B 21/06* (2006.01)

(52) U.S. Cl.
CPC ............ *G01F 1/002* (2013.01); *E21B 21/062* (2013.01); *E21B 43/267* (2013.01)

(58) Field of Classification Search
CPC ....... G01F 1/002; E21B 21/062; E21B 43/267
(Continued)

(56) References Cited

U.S. PATENT DOCUMENTS

| 710,611 A | 10/1902 | Ray |
| 917,646 A | 4/1909 | Otto |

(Continued)

FOREIGN PATENT DOCUMENTS

| EP | 2937826 A1 | 10/2015 |
| GB | 2066220 A | 7/1981 |

(Continued)

OTHER PUBLICATIONS

International Search Report and Written Opinion issued in related PCT Application No. PCT/US2015/067520 dated Sep. 22, 2016, 16 pages.

(Continued)

*Primary Examiner* — Suman K Nath
(74) *Attorney, Agent, or Firm* — John W. Wustenberg; Baker Botts L.L.P.

(57) ABSTRACT

In accordance with presently disclosed embodiments, systems and methods for determining the amount of bulk material being choke-fed into an inlet of a blender from one or more bulk material containers placed on a support structure are disclosed. The system includes sensors placed on the support structure beneath the one or more containers for determining the amount of bulk material contained within the container at any given time. By monitoring the change in the mass of the material in the containers overtime the amount of material being fed into the blender can be determined. The material is metered into a mixer within the blender using a metering mechanism, such as a sand screw, which supplies a fixed capacity of bulk material into the blender. The ability to precisely measure the amount of bulk (Continued)

material being choke-fed into the blender enables operators to calibrate the sand screw continuously.

20 Claims, 4 Drawing Sheets (58) Field of Classification Search
USPC .......................................................... 73/861
See application file for complete search history.

(56) References Cited

U.S. PATENT DOCUMENTS

| | | | |
|---|---|---|---|
| 1,519,153 A | 9/1923 | Mitton | |
| 1,726,603 A | 9/1929 | Wallace | |
| 1,795,987 A | 3/1931 | Adams | |
| 2,231,911 A | 2/1941 | Hitt et al. | |
| 2,281,497 A | 4/1942 | Hyson et al. | |
| 2,385,245 A | 9/1945 | Willoughby | |
| 2,415,782 A | 2/1947 | Zademach | |
| 2,513,012 A | 6/1950 | Dugas | |
| 2,563,470 A | 8/1951 | Kane | |
| 2,652,174 A | 9/1953 | Shea | |
| 2,670,866 A | 3/1954 | Glesby | |
| 2,678,737 A | 5/1954 | Mangrum | |
| 2,759,737 A | 8/1956 | Manning | |
| 2,802,603 A | 8/1957 | McCray | |
| 2,867,336 A | 1/1959 | Soldini et al. | |
| 3,049,248 A | 8/1962 | Heltzel et al. | |
| 3,083,879 A | 4/1963 | Coleman | |
| 3,151,779 A | 10/1964 | Rensch et al. | |
| 3,203,370 A | 8/1965 | Friedrich et al. | |
| 3,217,927 A | 11/1965 | Bale, Jr. et al. | |
| 3,318,473 A | 5/1967 | Jones et al. | |
| 3,326,572 A | 6/1967 | Murray | |
| 3,343,688 A | 9/1967 | Ross | |
| 3,354,918 A | 11/1967 | Coleman | |
| 3,404,963 A | 10/1968 | Fritsche et al. | |
| 3,432,151 A | 3/1969 | O'Loughlin et al. | |
| 3,467,408 A | 9/1969 | Emil | |
| 3,476,270 A | 11/1969 | Cox et al. | |
| 3,602,400 A | 8/1971 | Cooke | |
| 3,627,555 A | 12/1971 | Driscoll | |
| 3,698,693 A | 10/1972 | Poncet | |
| 3,785,534 A | 1/1974 | Smith | |
| 3,802,584 A | 4/1974 | Sackett, Sr. et al. | |
| 3,986,708 A | 10/1976 | Heltzel et al. | |
| 4,023,719 A | 5/1977 | Noyon | |
| 4,058,239 A | 11/1977 | Van Mill | |
| 4,138,163 A | 2/1979 | Calvert et al. | |
| 4,178,117 A | 12/1979 | Brugler | |
| 4,204,773 A | 5/1980 | Bates | |
| 4,248,337 A | 2/1981 | Zimmer | |
| 4,258,953 A | 3/1981 | Johnson | |
| 4,313,708 A | 2/1982 | Tiliakos | |
| 4,395,052 A | 7/1983 | Rash | |
| 4,398,653 A | 8/1983 | Daloisio | |
| 4,423,884 A | 1/1984 | Gevers | |
| 4,538,222 A | 8/1985 | Crain et al. | |
| 4,544,279 A | 10/1985 | Rudolph | |
| 4,548,507 A | 10/1985 | Mathis et al. | |
| 4,583,663 A | 4/1986 | Bonerb | |
| 4,626,166 A | 12/1986 | Jolly | |
| 4,701,095 A | 10/1987 | Berryman et al. | |
| 4,779,186 A | 10/1988 | Handke et al. | |
| 4,806,065 A | 2/1989 | Holt et al. | |
| 4,850,702 A | 7/1989 | Arribau et al. | |
| 4,856,681 A | 8/1989 | Murray | |
| 4,900,157 A | 2/1990 | Stegemoeller et al. | |
| 4,919,540 A | 4/1990 | Stegemoeller et al. | |
| 4,953,097 A | 8/1990 | Crain et al. | |
| 4,956,821 A | 9/1990 | Fenelon | |
| 4,993,883 A | 2/1991 | Jones | |
| 4,997,335 A | 3/1991 | Prince | |
| 5,036,979 A | 8/1991 | Selz | |
| 5,089,975 A | 2/1992 | Mannion et al. | |
| 5,096,096 A | 3/1992 | Calaunan | |
| 5,114,169 A | 5/1992 | Botkin et al. | |
| 5,149,192 A | 9/1992 | Hamm et al. | |
| 5,303,998 A | 4/1994 | Whitlatch et al. | |
| 5,335,166 A | 8/1994 | Stephenson | |
| 5,339,996 A | 8/1994 | Dubbert et al. | |
| 5,343,813 A | 9/1994 | Septer | |
| 5,375,730 A | 12/1994 | Bahr et al. | |
| 5,401,129 A | 3/1995 | Eatinger | |
| 5,413,154 A | 5/1995 | Hurst, Jr. et al. | |
| 5,426,137 A | 6/1995 | Allen | |
| 5,441,321 A | 8/1995 | Karpisek | |
| 5,443,350 A | 8/1995 | Wilson | |
| 5,445,289 A | 8/1995 | Owen | |
| 5,590,976 A | 1/1997 | Kilheffer et al. | |
| 5,722,552 A | 3/1998 | Olson | |
| 5,772,390 A | 6/1998 | Walker | |
| 5,806,441 A | 9/1998 | Chung | |
| 5,913,459 A | 6/1999 | Gill et al. | |
| 5,915,913 A | 6/1999 | Greenlaw et al. | |
| 5,927,356 A | 7/1999 | Henderson | |
| 5,944,470 A | 8/1999 | Bonerb | |
| 5,997,099 A | 12/1999 | Collins | |
| 6,059,372 A | 5/2000 | McDonald et al. | |
| 6,112,946 A | 9/2000 | Bennett et al. | |
| 6,126,307 A | 10/2000 | Black et al. | |
| 6,193,402 B1 | 2/2001 | Grimland et al. | |
| 6,199,511 B1 * | 3/2001 | Thibault | A01K 5/0241 119/53 |
| 6,247,594 B1 | 6/2001 | Garton | |
| 6,379,086 B1 | 4/2002 | Goth | |
| 6,425,627 B1 | 7/2002 | Gee | |
| 6,491,421 B2 | 12/2002 | Rondeau et al. | |
| 6,517,232 B1 | 2/2003 | Blue | |
| 6,536,939 B1 | 3/2003 | Blue | |
| 6,537,015 B2 | 3/2003 | Lim et al. | |
| 6,568,567 B2 | 5/2003 | McKenzie et al. | |
| 6,622,849 B1 | 9/2003 | Sperling | |
| 6,655,548 B2 | 12/2003 | McClure, Jr. et al. | |
| 6,876,904 B2 | 4/2005 | Oberg et al. | |
| 6,980,914 B2 | 12/2005 | Bivens et al. | |
| 7,008,163 B2 | 3/2006 | Russell | |
| 7,086,342 B2 | 8/2006 | O'Neall et al. | |
| 7,100,896 B1 | 9/2006 | Cox | |
| 7,114,905 B2 | 10/2006 | Dibdin | |
| 7,252,309 B2 | 8/2007 | Eng Soon et al. | |
| 7,284,579 B2 | 10/2007 | Elgan | |
| 7,451,015 B2 | 11/2008 | Mazur et al. | |
| 7,475,796 B2 | 1/2009 | Garton | |
| 7,500,817 B2 | 3/2009 | Furrer et al. | |
| 7,513,280 B2 | 4/2009 | Brashears et al. | |
| 7,660,648 B2 | 2/2010 | Dykstra | |
| 7,665,788 B2 | 2/2010 | Dibdin et al. | |
| 7,686,499 B2 | 3/2010 | Dykstra et al. | |
| 7,735,365 B2 | 6/2010 | Crain et al. | |
| 7,762,281 B2 | 7/2010 | Schuld | |
| 7,997,213 B1 | 8/2011 | Gauthier et al. | |
| 8,354,602 B2 | 1/2013 | Lucas et al. | |
| 8,387,824 B2 | 3/2013 | Wietgrefe | |
| 8,434,990 B2 | 5/2013 | Claussen | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |
| 8,545,148 B2 | 10/2013 | Wanek-Pusset et al. | |
| 8,573,917 B2 | 11/2013 | Renyer | |
| 8,585,341 B1 | 11/2013 | Oren | |
| 8,607,289 B2 | 12/2013 | Brown et al. | |
| 8,616,370 B2 | 12/2013 | Allegretti et al. | |
| 8,622,251 B2 | 1/2014 | Oren | |
| 8,662,525 B1 | 3/2014 | Dierks et al. | |
| 8,668,430 B2 | 3/2014 | Oren et al. | |
| D703,582 S | 4/2014 | Oren | |
| 8,827,118 B2 | 9/2014 | Oren | |
| 8,834,012 B2 | 9/2014 | Case et al. | |
| 8,887,914 B2 | 11/2014 | Allegretti et al. | |
| RE45,713 E | 10/2015 | Oren et al. | |
| 9,162,603 B2 | 10/2015 | Oren | |

(56) References Cited

U.S. PATENT DOCUMENTS

| | | |
|---|---|---|
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,604,338 B2 | 3/2020 | Allegretti |
| 2002/0093875 A1* | 7/2002 | Rondeau .............. B01F 3/1271 366/8 |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 | 1/2007 | Diosse et al. |
| 2007/0201305 A1 | 8/2007 | Heilman et al. |
| 2008/0187423 A1 | 8/2008 | Mauchle |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0314791 A1 | 12/2009 | Hartley et al. |
| 2010/0027371 A1* | 2/2010 | Lucas .................. B01F 3/1271 366/134 |
| 2010/0319921 A1* | 12/2010 | Eia .................. E21B 21/062 166/305.1 |
| 2011/0063942 A1 | 3/2011 | Hagan et al. |
| 2012/0017812 A1 | 1/2012 | Renyer et al. |
| 2012/0018093 A1 | 1/2012 | Zuniga et al. |
| 2012/0037231 A1 | 2/2012 | Janson |
| 2012/0181093 A1 | 7/2012 | Fehr et al. |
| 2012/0219391 A1 | 8/2012 | Teichrob et al. |
| 2013/0135958 A1 | 5/2013 | O'Callaghan |
| 2013/0142601 A1 | 6/2013 | McIver et al. |
| 2013/0206415 A1 | 8/2013 | Sheesley |
| 2013/0284729 A1 | 10/2013 | Cook et al. |
| 2014/0023463 A1 | 1/2014 | Oren |
| 2014/0041322 A1 | 2/2014 | Pham et al. |
| 2014/0044508 A1 | 2/2014 | Luharuka et al. |
| 2014/0083554 A1 | 3/2014 | Harris |
| 2014/0216736 A1 | 8/2014 | Leugemors et al. |
| 2014/0234059 A1 | 8/2014 | Thomeer |
| 2014/0305769 A1 | 10/2014 | Eiden, III et al. |
| 2014/0377042 A1 | 12/2014 | McMahon |
| 2015/0003955 A1 | 1/2015 | Oren et al. |
| 2015/0013436 A1 | 1/2015 | Heaton et al. |
| 2015/0016209 A1 | 1/2015 | Barton et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver et al. |
| 2017/0129696 A1 | 5/2017 | Oren |
| 2017/0144834 A1 | 5/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0334639 A1 | 11/2017 | Hawkins et al. |
| 2017/0349226 A1 | 12/2017 | Oren et al. |
| 2018/0257814 A1 | 9/2018 | Allegretti et al. |
| 2018/0369762 A1 | 12/2018 | Hunter et al. |
| 2019/0009231 A1 | 1/2019 | Warren et al. |
| 2019/0111401 A1 | 4/2019 | Lucas et al. |
| 2020/0062448 A1 | 2/2020 | Allegretti et al. |

FOREIGN PATENT DOCUMENTS

| | | |
|---|---|---|
| GB | 2204847 A1 | 11/1988 |
| JP | 2008239019 A | 10/2008 |
| WO | 2008012513 A2 | 1/2008 |
| WO | 2011/126723 A2 | 10/2011 |
| WO | 2013095871 A1 | 6/2013 |
| WO | 2013142421 A1 | 9/2013 |
| WO | 2014018129 A1 | 1/2014 |
| WO | 2014018236 A2 | 5/2014 |
| WO | 2015119799 A1 | 8/2015 |
| WO | 2015191150 A1 | 12/2015 |
| WO | 2015192061 A1 | 12/2015 |

(56) References Cited

FOREIGN PATENT DOCUMENTS

| WO | 2016044012 A1 | 3/2016 |
|---|---|---|
| WO | 2016160067 A1 | 10/2016 |

OTHER PUBLICATIONS

International Preliminary Report on Patentability issued in related PCT Application No. PCT/US2015/067520 dated Jul. 5, 2018, 13 pages.
Office Action issued in related Canadian Patent Application No. 2,996,055 dated Oct. 2, 2020, 5 pages.
U.S. Pat. No. 0802254A, Oct. 17, 1905, "Can-Cooking Apparatus," John Baker et al.

\* cited by examiner

SYSTEM AND METHOD FOR DETERMINING SLURRY SAND CONCENTRATION AND CONTINUOUS CALIBRATION OF METERING MECHANISMS FOR TRANSFERRING SAME

CROSS-REFERENCE TO RELATED APPLICATION

The present application is a U.S. National Stage Application of International Application No. PCT/US2015/067520 filed Dec. 22, 2015, which is incorporated herein by reference in its entirety for all purposes.

TECHNICAL FIELD

The present disclosure relates generally to transferring bulk materials for use in downhole treatment fluids, and more particularly, to accurate measurement of bulk materials during operation at a well site.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. Hydraulic fracturing operations may use a wide range of fluid viscosities and characteristics also to transport proppant into natural and induced fractures in the petroleum bearing formation. The wellbore treating fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material by means of an auger screw into a blender tub.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. The containers are eventually emptied by dumping the contents thereof onto a mechanical conveying system (e.g., conveyor belt, auger, bucket lift, etc.). The conveying system then moves the bulk material in a metered fashion to a desired destination at the well site.

An important aspect of delivering bulk dry material and liquid materials used in forming sand slurries and other downhole treatment and completion fluids is the accurate measurement of the amount of bulk dry and liquid materials used in the production of such slurries and fluids. Accurate measure is important for a number of reasons other than the physical properties of the slurry, an important one of which being for accounting and billing purposes. In today's downhole operations, there are a wide variety of measurement methods used, each having its own level of accuracy and unique sources of error.

Fluid additive tanks are most commonly measured volumetrically with a depth stick or strap. Each container has a unique measurement strap that is calibrated to the varying cross-sectional area of the container. This method is prone to a high degree of subjectivity due to the fact that the operator is reading the depth measured on the strap. This method also generally does not account for changes in the fluid volume due to thermal expansion or contraction as may occur with temperature changes. As the fluids are drawn from the bulk tanks it is passed through expensive, generally highly accurate, coriolis flow meters before being mixed with the treatment slurry. However, any air entrainment in the fluid significantly impacts the accuracy of the coriolis measurements. As a result, great efforts in personnel time are taken to reconcile discrepancies caused by such inaccuracies.

Dry additives (e.g., sand, proppant, gel, diverters, etc.) are generally measured using auger screws. The dry material is typically delivered to a hopper and metered/conveyed from the hopper to the mixer with an auger screw. The volume or mass flow rate of dry material is determined from the rotational speed, or revolutions per minute (RPM) of the screw and a calibration factor (weight or volume of material moved per revolution of the auger, which may be measured in lbs/rev or via a drive signal measured in lb/mA) for that particular material, screw size, and screw orientation. For example, the sand screws are placed at an angle to lift the sand from the hopper to the top of the mixing tub. Each sand type (100 mesh, 20/40 mesh, resin coated, etc.) will have different transfer efficiencies through the screw, and require a different calibration curve. However, the calibration factor may vary if additional humidity is present in the sand, or if liquid additives/coatings are being mulled into the sand in the screw, such as is the case with the SandWedge® or FinesWedge® systems, provided by Halliburton, the assignee of the present application. The depth of material covering the auger inlet and dimensional changes caused by wear also affect the calibration curve. In addition, the testing required to calibrate the screws for each material is not trivial. Accordingly, only a small number of the various sand types have measured calibration curves, and calibration factors are often assumed by the blender operators.

Due to the inaccuracies in the these measures, many customers of service companies require that additional measurements be taken to determine, in particular, the sand concentration of the treatment slurry being delivered to the wellhead. The sand concentration is indirectly measured using a radioactive densometer placed downstream and proximate an outlet of the mixing tub. If the base fluid density is accurately known, then the bulk density measurement from the densometer can be reliably used to provide the sand concentration in lbm sand per gallon of fluid. However, the exact base fluid density is often unknown due to the variety of water sources that are used, the variation in salt concentration in the water through the job, and the various additives being introduced to the fluid before the densometer.

Accordingly, a direct and precise measurement of the bulk material being added to the mixing tub prior to mixing with the liquid additives is desired.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The method according to the present disclosure will now be described. Electronic load cells (scales) are placed under each bulk material container (dry or liquid) so that the mass of the material in the container can be directly measured continuously. By observing the change in total mass over time, the mass flow rate may be accurately obtained, irrespective of air entrainment in the fluid or along the flow lines or changes in density due to thermal expansion. The present disclosure's approach of using a mass measurement will eliminate the need for expensive micro-motion flowmeters, which will result in a capital cost savings. Also, this will minimize any discrepancy between volume measurements of the material in the container, liquid volume flow rates to the blender, and the amount of product to be billed to the customer.

The present disclosure also provides for placing the portable sand containers (e.g., on the containers used in the Xpress™ Sand Delivery System provided by Halliburton, the assignee of the present application) on load cells. The mass of proppant in each container can be continuously measured to produce the mass flow rate of proppant to the blender. Even though the proppant is generally first delivered to the blender hopper before being lifted/metered by the sand screws to the mixing tub, under steady operation, the choked gravity feed between the Xpress™ Sand container and the hopper will require that the volume of sand in the hopper remain constant. So the mass flow rate leaving the container will be equal to the mass flow rate being passed through the sand screws. Due to this configuration, the calibration factors for the sand screws can be regularly updated as the sand properties and sand screw RPM vary throughout the job. A similar process can be used for the other dry additive measurements, transfer and calibrated mass flow control.

The reason for updating the sand screw calibration factors is that these calibration factors are used in the blender control algorithms to set the screw speeds to achieve the desired product flow rate. Details of these automatic control systems for the sand screws can be found in U.S. Pat. Nos. 4,779,186 and 5,335,166. Thus, rather than using the post blender bulk density measurement from the densometer to provide the feedback to the control system to automatically adjust the sand screw speed to achieve the expected bulk density of the slurry for the assumed base fluid density and desired sand concentration, the control system can directly regulate the screw speed to achieve the desired sand mass flow rate. In order to provide an accurate calibration measure, the sand screw speed must be held constant for a given amount of time to ensure steady operation. As such, the control system for the screws will need to be modified to periodically not automatically update the screw speed to achieve the desired/programmed post blender sand concentration and allow for an accurate calibration run.

Alternatively, a control algorithm for the sand screws, or other dry material transfer, may be implemented that does not require a calibration factor. Such a control algorithm may take as inputs the measured mass flow rate leaving the container, the desired mass flow rate, and the current sand screw RPM. The output of the control algorithm may be the change in sand screw RPM required to achieve the desired mass flow rate. The necessary change of RPM may be calculated using various methods, depending on the type of feedback control method being applied (e.g., proportional control, proportional-integral-derivative control, etc.). With the mass flow rate being measured for each material additive source making up the treatment slurry, the total mass flow rate of additives is directly known. In order to extract the sand concentrations per volume of clean fluid, an additional measurement is needed, namely the volume flow rate from the clean water source. By measuring the volume flow rate of the clean water source, and comparing to the sand mass flow rate, the sand concentration per volume of clean fluid can be directly calculated as the ratio of these two measurements. This is the primary value required to meet typical job designs in the field.

In another aspect of the present disclosure, the control system monitors changes in the calibration factor over time, such that a decreasing trend in the calibration factor generally indicates that the metering mechanism needs replacement. The control system can be programmed to warn the operator to make such a change.

Figure 1:
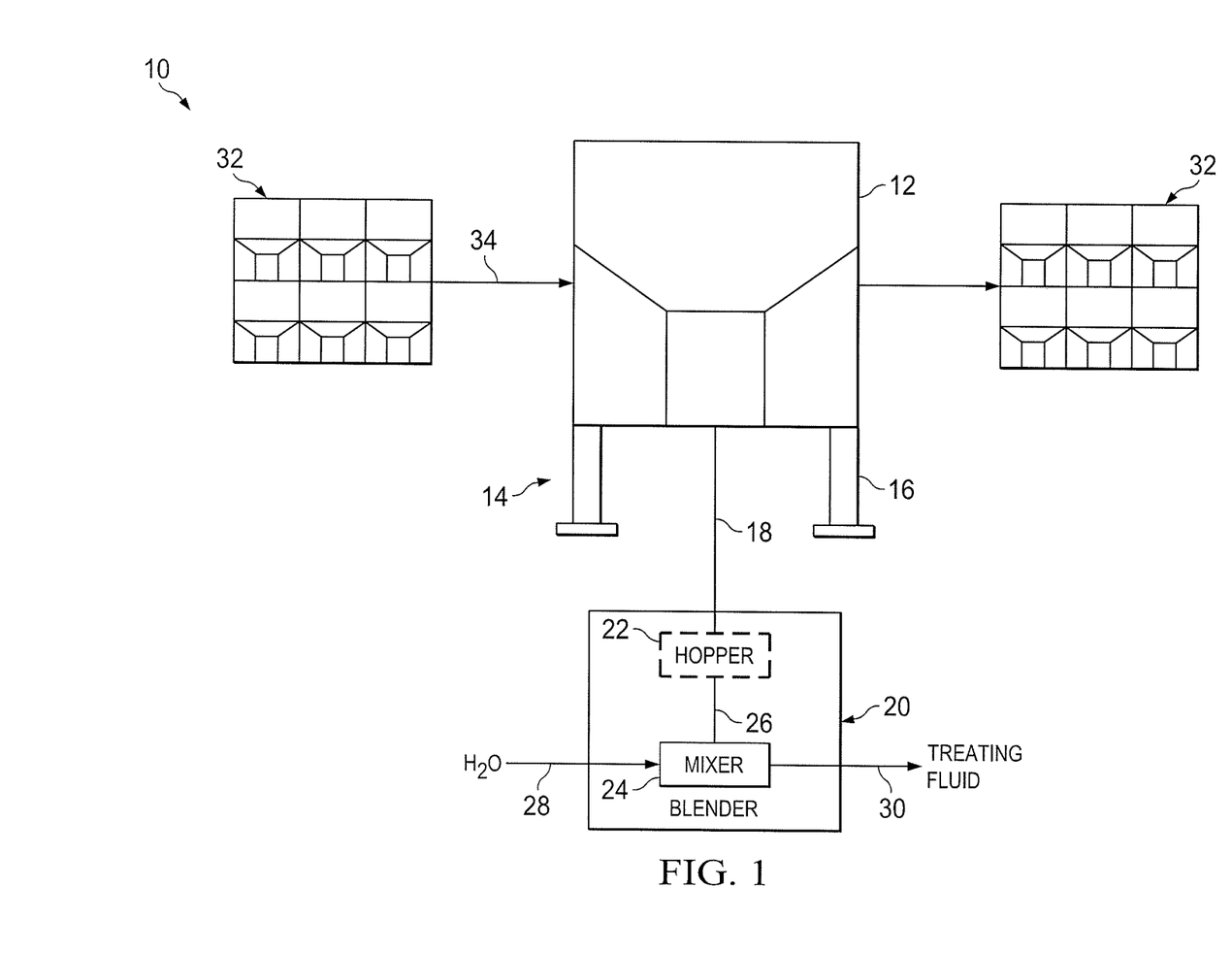
FIG. 1 is a schematic block diagram of a system for delivering bulk material from a container disposed on a portable support structure in to a blender, in accordance with an embodiment of the present disclosure.

Turning now to the drawings, the system in accordance with present disclosure will now be described. FIG. 1 is a block diagram of a bulk material handling system 10 in accordance with the present disclosure. The system 10 includes a container 12 elevated on a portable support structure 14 and holding a quantity of bulk material (e.g., solid or liquid treating material). The portable support structure 14 may include a frame 16 for receiving and holding the container 12 and a gravity feed outlet 18 for directing bulk material away from the container 12. The outlet 18 may be coupled to and extending from the frame 16. The outlet 18 may utilize a gravity feed to provide a controlled, i.e., metered, flow of bulk material from the container 12 to a blender unit 20.

As illustrated, the blender unit 20 may include a hopper 22 and a mixing tub or mixer 24. The blender unit 20 may also include a metering mechanism 26 for providing a controlled, i.e., metered, flow of bulk material from the hopper 22 to the mixer 24. An exemplary metering mechanism 26 is a sand screw, which has the shape of an auger and permits discrete quantities of bulk material to be conveyed over a unit of time.

Figure 3:
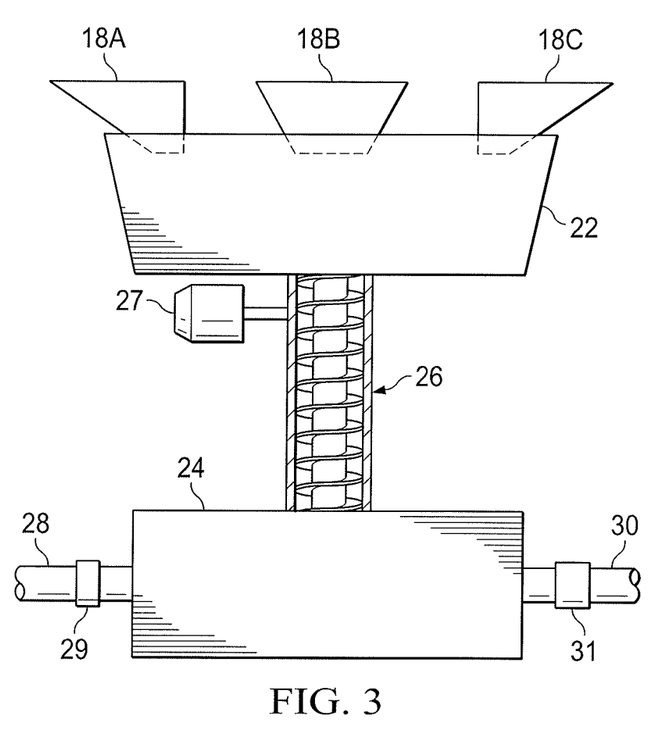
FIG. 3 is a schematic diagram of the mechanisms for delivering bulk material and clean fluids into a mixer in accordance with the present disclosure.

Water and other additives may be supplied to the mixer 24 through a fluid inlet flow line 28. As those of ordinary skill in the art will appreciate, the fluid inlet flow line 28 may comprise more than the one input flow line illustrated in FIG. 1. A flow meter 29 (shown in FIG. 3) may optionally be installed in the fluid inlet flow line 28 for measuring the flow rate of the fluid being injected into the mixer 24. It is connected either via a wired connection or wirelessly to the controller 90, as described in further detail below. The bulk material and water may be mixed in the mixer 24 to produce (at an outlet flow line 30) a fracing fluid, a mixture combining multiple types of proppant, proppant/dry-gel particulate mixture, sand/sand-diverting agents mixture, cement slurry, drilling mud, a mortar or concrete mixture, or any other fluid mixture for use on location. The outlet flow line 30 may be coupled to a pump for conveying the treating fluid to a desired location (e.g., a hydrocarbon recovery well) for a treating process. A densometer 31 (shown in FIG. 3) may optionally be installed in the outline flow line 30 to measure the sand concentration exiting the mixer 24. The densometer 31 is connected to the controller 90 either via a wired connection or wirelessly, as described in further detail below.

It should be noted that the disclosed container 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, the container 12 may be elevated above an outlet location via the frame 16. The support structure 14 is designed to elevate the container 12 above the level of the blender inlet (e.g., blender hopper 22 and/or mixing tub 24) to allow the bulk material to gravity feed from the container 12 to the blender unit 20. This way, the container 12 is able to sit on the frame 16 of the support structure 14 and output bulk material directly into the blender unit 20 via the gravity feed outlet 18 of the support structure 14.

Although shown as supporting a single container 12, other embodiments of the frame 16 may be configured to support multiple containers 12. The exact number of containers 12 that the support structure 14 can hold may depend on a combination of factors such as, for example, the volume, width, and weight of the containers 12 to be disposed thereon.

In any case, the container(s) 12 may be completely separable and transportable from the frame 16, such that any container 12 may be selectively removed from the frame 16 and replaced with another container 12. That way, once the bulk material from the container 12 runs low or empties, a new container 12 may be placed on the frame 16 to maintain a steady flow of bulk material to an outlet location. In some instances, the container 12 may be closed before being completely emptied, removed from the frame 16, and replaced by a container 12 holding a different type of bulk material to be provided to the outlet location.

A portable bulk storage system 32 may be provided at the site for storing one or more additional containers 12 of bulk material to be positioned on the frame 16 of the support structure 14. The bulk material containers 12 may be transported to the desired location on a transportation unit (e.g., truck). The bulk storage system 32 may be the transportation unit itself or may be a skid, a pallet, or some other holding area. One or more containers 12 of bulk material may be transferred from the storage system 32 onto the support structure 14, as indicated by arrow 34. This transfer may be performed by lifting the container 12 via a hoisting mechanism, such as a forklift, a crane, or a specially designed container management device.

When the one or more containers 12 are positioned on the support structure 14, discharge gates on one or more of the containers 12 may be opened, allowing bulk material to flow from the containers 12 into the outlet 18 of the support structure 14. The outlet 18 may then route the flow of bulk material directly into a blender inlet (e.g., into the hopper 22 or mixer 24) of the blender unit 20.

After one or more of the containers 12 on the support structure 14 are emptied, the empty container(s) 12 may be removed from the support structure 14 via a hoisting mechanism. In some embodiments, the one or more empty containers 12 may be positioned on another bulk storage system 32 (e.g., a transportation unit, a skid, a pallet, or some other holding area) until they can be removed from the site and/or refilled. In other embodiments, the one or more empty containers 12 may be positioned directly onto a transportation unit for transporting the empty containers 12 away from the site. It should be noted that the same transportation unit used to provide one or more filled containers 12 to the location may then be utilized to remove one or more empty containers 12 from the site.

Figure 2:
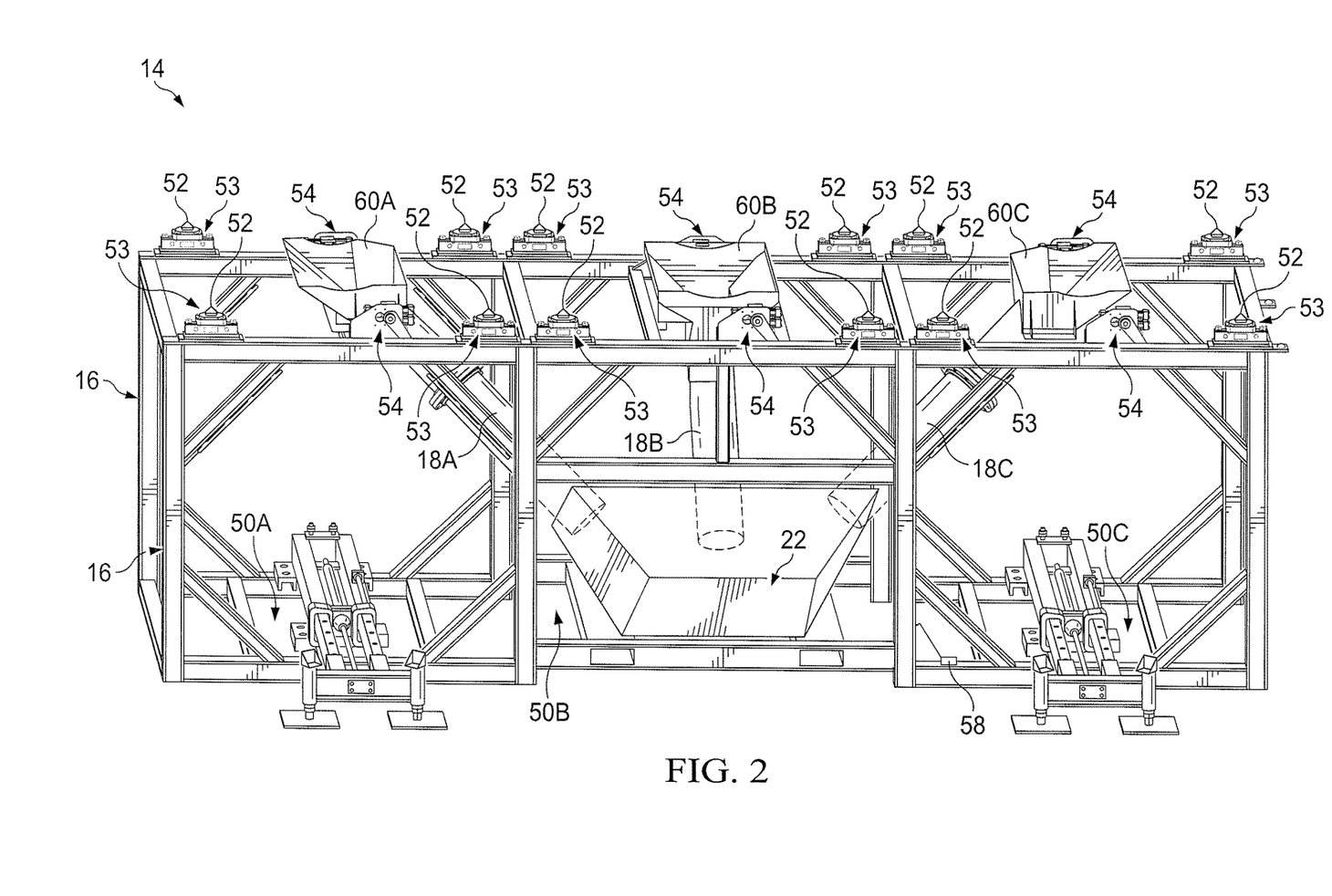
FIG. 2 is a perspective view of a portable support structure used to support and weigh a plurality of containers of bulk material, in accordance with an embodiment of the present disclosure.

FIG. 2 illustrates an embodiment of the support structure 14 that may be designed to receive multiple containers. Specifically, the support structure 14 includes a frame 16 sized to receive and support up to three portable containers. The frame 16 may include several beams connected together (e.g., via welds, rivets or bolts) to form a continuous group of cubic or rectangular shaped supports 50 coupled end to end. For example, in the illustrated embodiment the frame 16 generally includes one continuous, elongated rectangular body broken into three distinct cubic/rectangular supports 50A, 50B, and 50C. Each cubic/rectangular support 50 may be used to support a single container. The frame 16 may include additional beams that function as trusses to help support the weight of the filled containers disposed on the frame 16. Other shapes, layouts, and constructions of the frame 16 may be used in other embodiments. In addition, other embodiments of the support structure 14 may include a frame 16 sized to receive other numbers (e.g., 1, 2, 4, 5, 6, 7, or more) portable containers. As those of ordinary skill in the art will appreciate, the exact number of containers on the frame 14 is not critical to the present disclosure.

As illustrated, the support structure 14 may be equipped with a plurality of container mounts 52 disposed on top of the frame 16 for positioning and holding the containers on the frame 16. The containers may include complementary engagement features designed to interface with the mounts 52, thus enabling a precise placement of the containers into desired locations on the frame 16. In the illustrated embodiment, the mounts 52 are generally disposed at the corners on the upper face of each cubic/rectangular support 50. However, other placements of the mounts 52 along the upper surface of the support structure 16 may be utilized in other embodiments.

Figure 4:
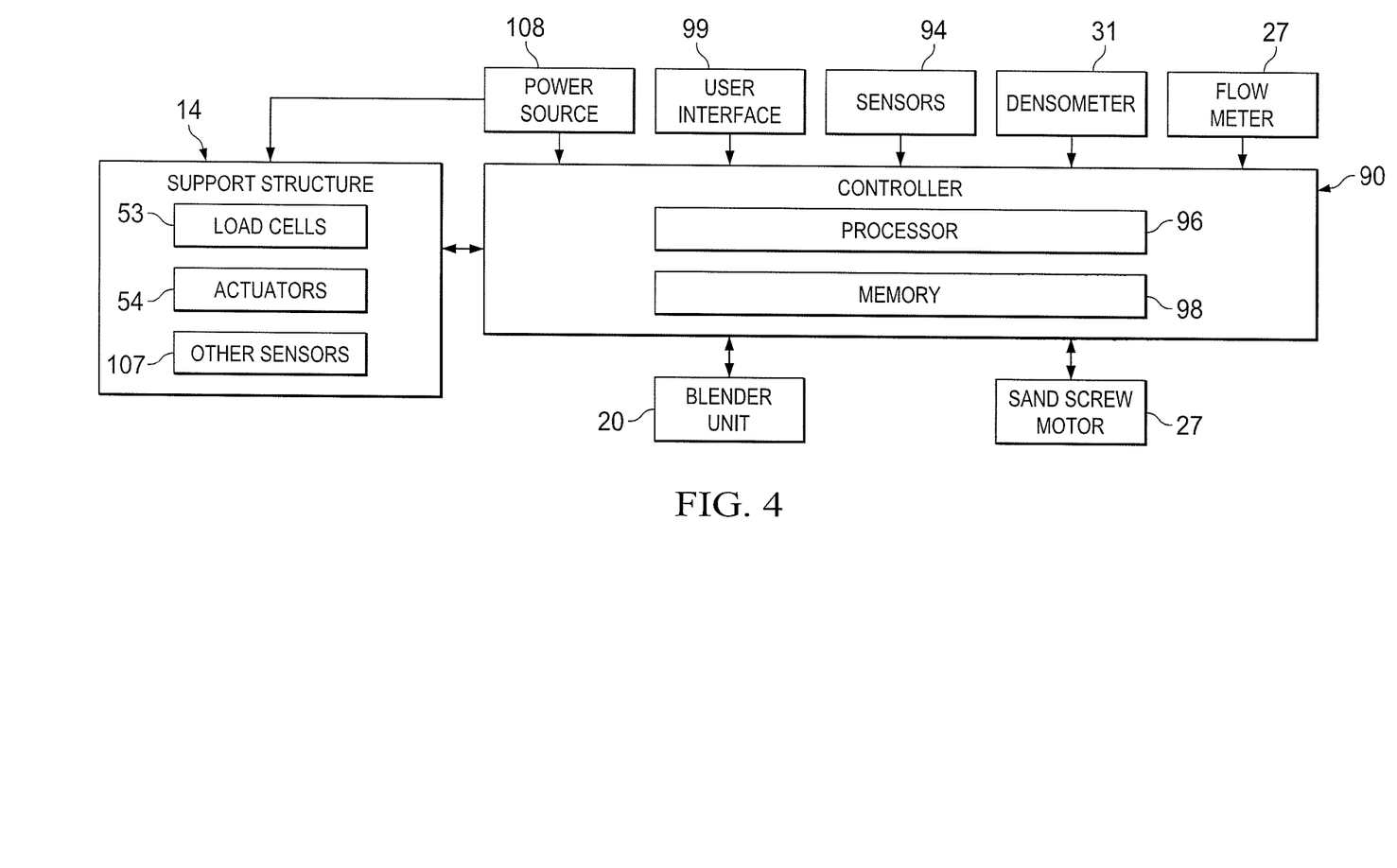
FIG. 4 is a schematic block diagram of an embodiment of an electronics control system that measures the amount of dry bulk material being choke-fed into the blender and calibrates a sand screw used to meter the dry bulk material into the mixing tub of the blender in accordance with an embodiment of the present disclosure.

Beneath each mount 52 is disposed a micro-scale load cell 53. Exemplary micro-scale load cells 53, include, but are not limited to strain gauges, piezoelectric gauges, hydraulic or pneumatic gauges, or similar devices. Each micro-scale load-cell 53 is connected via a wired or wireless connection to a controller 90, as shown in FIG. 4. Each micro-scale load cell 53 communicates a signal indicative of the weight of the container and its contents sensed by the load cell. With knowledge of the mass of each container, an algorithm stored in the memory 98 and executed by the processor 96, can determine the mass of bulk material in each of the containers 12. Furthermore, by monitoring the change in the weight of the bulk material being fed from the containers into the blender 20 per unit of time the flow rate of the bulk material into the blender can be determined. Since there is no loss of the bulk material being delivered to the blender 20 given the closed nature of the system and the fixed capacity of the sand screw, the flow rate determined using this technique results in a highly accurate determination of the amount of bulk material being utilized. This in turn allows for accurate accounting and thus accurate billing for the amount of bulk product being consumed.

The support structure 14 may also include one or more actuators 54 designed to aid in actuation of a discharge gate of the one or more containers disposed on the frame 16. In the illustrated embodiment, the actuators 54 may be rotary actuators designed to rotate into engagement with a discharge gate of a container to transition the gate between a closed position and an open position. In other embodiments, the actuators 54 may be linear actuators designed to interface with the gates of the containers to selectively open and close the gates. In some embodiments, the actuators 54 may include a set of two actuators (disposed on opposite sides of the frame 16) for actuating the discharge gate of a single container disposed on the frame 16. In such an arrangement, one of the actuators 54 may transition the gate from closed to open, while the opposite actuator 54 may transition the gate from open to closed.

As described above, the support structure 14 may include several gravity feed outlets 18 for routing bulk material directly from one or more containers disposed on the frame 16 into a blender inlet. The blender inlet may be a blender hopper (e.g., hopper 22 of FIG. 1) used to provide bulk material to a metering system that meters the bulk material into a mixer. In another embodiment, the blender inlet may be the sand screw or other similar metering mechanism 26 of FIG. 1. Other embodiments may utilize other types of blender inlets for receiving the bulk material from the containers disposed on the support structure 14. The blender 20 of the present disclosure, however, contemplates use of a sand screw 26 or other similar metering mechanism (such as a metering gate or valve positioned above the mixer) 26 for metering the bulk material into the mixer 24. A close up of the blender 20 employing a metering mechanism 26 such as a sand screw in connection with the present disclosure can be seen in FIG. 3. An electric motor 27 which controls the rotation of the sand screw is attached via gears to the main shaft of the sand screw onto which is affixed an auger. The electric motor 27 is connected to the controller 90 via a wired connection or wirelessly as further explained below. Alternatively, a hydraulic motor could also be used for driving the auger.

The gravity feed outlets 18A, 18B, and 18C may be used to deliver a flow of bulk material to the blender hopper 22 (or other blender inlet) from each of three respective containers disposed on the frame 16. In some embodiments, the support structure 14 may also include individual hoppers 60A, 60B, and 60C at the top of the frame 16 for funneling bulk material from the discharge gate of the corresponding containers into the gravity feed outlets 18A, 18B, and 18C, respectively.

The gravity feed outlets 18A, 18B, and 18C may be chutes positioned so that the upper end of each chute is disposed beneath a discharge gate of a corresponding container (or one of the hoppers 60) on the frame 16. The gravity feed outlets 18 may be positioned such that the lower end of each chute is disposed fully within the blender hopper 22. This allows the gravity feed outlets 18 to provide bulk material from all of the containers positioned on the frame 16 into the same blender inlet (e.g., blender hopper 22) at the same time. The outlets 18 are able to provide a gravity feed where an angle of repose of the bulk material exiting the chutes is able to choke the flow of bulk material through the chutes. As bulk material is metered from the blender hopper 22 into another portion of the blender (e.g., mixer), additional bulk material is able to flow via gravity into the hopper 22 directly from the one or more outlets 18. In embodiments where the gravity feed outlets 18 are positioned to route bulk material directly from the containers into an inlet of the mixer of the blender unit, the outlets 18 and/or the blender inlet may feature a metering gate/valve used to regulate the amount of bulk material provided into the mixer (e.g., instead of separate sand screws)

The disclosed gravity feed outlets 18 provide a more controlled output of bulk material to the blender inlet (e.g., blender hopper 22) than would be available through the use of mechanical conveying systems to drop bulk material into the hopper. In addition, the choke feed of bulk material through the outlets 18 and into the blender inlet may reduce an amount of dust generated at a well site, as compared to existing pneumatic or mechanical conveying systems. Further, the gravity feed outlets 18 are able to route the bulk material directly into the blender inlet from the containers without the use of pneumatic or mechanical conveyance equipment operating on auxiliary power. This makes the process of moving the bulk material more efficient than would be possible using a separate pneumatic or mechanical conveyor between the containers and the blender. Finally, use of the gravity feed/choke-feed outlets 18 allows for a fixed capacity of bulk material to be delivered into the blender inlet.

Having discussed the mechanical components that make up system for determining the amount of bulk material being fed into a blender 20, a more detailed discussion of various electronics and controls that may be used within or communicatively coupled to the support structure 14 will be provided. FIG. 4 is a block diagram illustrating the various electronic and control components that may be used throughout a well site with the disclosed portable support structure 14.

The portable support structure 14 may include a number of electronic components, and these components may be communicatively coupled (e.g., via a wired connection or wirelessly) to one or more controllers 90 (e.g., automated control system) at the well site. For purposes of the present disclosure, the plurality of load cells 53 is connected to the controller. Furthermore, the fluid flow meter 29 is also connected to controller. The densometer 31 may optionally be connected to the controller. Also, the sand screw motor 27 is connected to the controller 90. In the alternative embodiment where a hydraulic motor is used, the controller 90 would be connected to a hydraulic pump or valve that would control the flow rate of fluid to the hydraulic motor. The control system 90 may be communicatively coupled to several other well site components including, but not limited to, the blender unit 20, the actuators 54, and various other sensors 107.

The control system 90 utilizes at least a processor component 96 and a memory component 98 to monitor and/or control various operations and bulk material inventory at the well site and perform other calculations. For example, one or more processor components 96 may be designed to execute instructions encoded into the one or more memory components 98. Upon executing these instructions, the processors 96 may execute one or more algorithms to determine the amount of bulk material flowing into the blender 20 from the one or more containers 12. They may also determine the sand concentration exiting the mixer 24 using the weight measurements communicated from the load cells 53 and the fluid flow rate information communicated from the flow meter(s) 29. This information can be compared to the sand concentration measured by the densometer 31. Furthermore, the densometer 31 measurements can be used to indirectly determine the amount of bulk material entering into the mixer 24 and compared against the calculations made by the processor 96 using the signals and measurements made by the load cells 53. Any discrepancies can be used to alter the calibration factor for the sand screw 26. The processor 96 can also control the sand screw speed via signals sent to the electric motor 27 (or alternatively to a hydraulic pump or valve controlling fluid flow to a hydraulic motor). The amount of bulk material contained within the containers 12 as determined using the micro-scale load cells 53 can also be compared to the weight ticket supplied from the load station where the containers 12 were filled. Furthermore, the calibration factor of the sand screw can be continuously updated based on the measurements obtained from the micro-scale load cells independent of any measurements taken from the densometer 31. The calibration values could be monitored over time to determine condition or amount of wear on the auger, the lbs/rev output will decrease with wear.

Furthermore, the controller 90 can be used for controlling passive logging of certain operations at the well site, as well as the amount, type, and location of bulk materials at the well site. In some embodiments, the one or more processors 96 may execute instructions for controlling operations of certain well site components (e.g., support structure electronics, blender unit 20, hoisting mechanism 92, etc.). This may help to control transportation and placement of the support structure 14 relative to the blender inlet, as well as bulk material transfer at the well site. For example, the processors 96 may output signals at a user interface 99 for instructing operators to remove an empty container from the support structure 14 and replace the container with a new container holding a certain type of bulk material needed for the well treatment. Other types of instructions for inventory control/monitoring may be provided through the disclosed systems.

As shown, the support structure 14 itself may include a number of electronic components such as, for example, the automated actuators 54 described above with reference to FIG. 2. These actuators 54 may be controlled to open and/or close a discharge gate of one or more containers elevated on the support structure 14.

Other sensors 107 may be present throughout the support structure 14 for monitoring other operations in the delivery of the bulk material and fluids to the mixer 24 and the discharge of the sand concentration or other product of the mixer 24 out of the mixer and downhole.

The controller 90, the support structure electronics, or both, may utilize power from an external power source 108, as shown. In other embodiments, the support structure 14 may include its own power source 108 for operating the onboard electronics and sensors.

As mentioned above, the controller 90 may be communicatively coupled to various other sensors 94 disposed about the well site. In some embodiments, these sensors 94 may include one or more load cells or bin full switches for tracking a level of bulk material in a portable container and indicating whether the container is empty, full, or partially full. Such sensors 94 may be used for any given container, the blender hopper, a silo (not shown), or any other component at the well site. In addition, in some embodiments the sensors 94 may include RFID tags used to provide an indication of the particle size, bulk volume, weight, type, material, and/or supplier of the bulk material disposed in a certain container. In such instances, the controller 90 may be communicatively coupled to an RFID reader disposed in proximity to the containers being moved about the well site.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
  a portable support structure for holding at least one portable container of bulk material at a position proximate a blender inlet, wherein the support structure comprises:
    a frame for receiving and holding the at least one portable container thereon;
    at least one sensor disposed in a position to sense an amount of bulk material in the at least one portable container; and
    a choke-feed outlet coupled to the frame for routing the bulk material from the at least one portable container directly into the blender inlet;
  a metering mechanism disposed at the blender inlet; and
  a controller in communication with the at least one sensor programmed to determine the amount of bulk material contained within the at least one portable container and a rate of bulk material being routed into the blender inlet and through the metering mechanism, wherein the controller is programmed to calculate a calibration factor for the metering mechanism based at least in part on a measurement from the at least one sensor.

2. The system of claim 1, wherein the at least one sensor comprise a plurality of micro-scale load cells.

3. The system of claim 1, further comprising:
  a hopper disposed at the blender inlet, wherein an outlet of the hopper is coupled to an inlet of the metering mechanism; and
  a mixer coupled to an outlet of the metering mechanism.

4. The system of claim 1, wherein the at least one sensor measures a weight of the at least one portable container.

5. The system of claim 1, further comprising an actuator coupled to the metering mechanism and the controller and wherein the controller is programmed to control operation of the actuator.

6. The system of claim 5, wherein the controller is programmed to adjust its control of the metering mechanism based on the rate of bulk material being fed into the blender inlet as measured by the at least one sensor.

7. The system of claim 1, wherein the controller is further programmed to monitor changes of the calibration factor over time.

8. The system of claim 1, wherein the controller receives an output from the at least one sensor and an output from a flowmeter coupled to a fluid inlet flow line to a blender unit having the blender inlet to calculate a concentration of the material in the blender unit.

9. A method, comprising:
receiving one or more portable containers of bulk material onto a frame of a portable support structure disposed proximate a blender inlet;
choke-feeding bulk material from the one or more portable containers into the blender inlet;
metering bulk material with a metering mechanism disposed at the blender inlet;
sensing an amount of bulk material in the one or more portable containers received on the frame of the portable support structure using at least one sensor on the portable support structure;
determining, via a controller in communication with the at least one sensor, a rate of bulk material being choke-fed into the blender inlet based on the amount of bulk material sensed in the one of more portable containers as a function of time; and
calibrating the metering mechanism via the controller based at least in part on the rate of bulk material determined to be choke-fed into the blender inlet based at least in part on a measurement from the at least one sensor, wherein the controller is programmed to calculate a calibration factor for the metering mechanism based at least in part on a measurement from the at least one sensor.

10. The method of claim 9, further comprising comparing the amount of bulk material sensed to be in the one or more portable containers received on the frame of the portable support structure to an amount of bulk material recorded on a weight ticket which was determined to be in the one or more portable containers at a location where the one or more portable container were filled with bulk material.

11. The method of claim 9, further comprising metering bulk material from the blender inlet into an inlet of a mixing chamber via the metering mechanism.

12. The method of claim 9, wherein sensing the amount of bulk material in the one or more portable containers received on the frame includes sensing a weight of the one or more portable containers using a plurality of micro-scale load cells placed on the support structure beneath the one or more containers.

13. The method of claim 12, wherein sensing the weight of the one or more portable containers comprises measuring the weight using a plurality of strain gauges.

14. The method of claim 9, wherein determining the rate of bulk material being choke-fed into the blender inlet comprises sensing the amount of bulk material in the one or more containers at discrete time intervals and determining the difference in the amount of bulk material sensed between those discrete time intervals.

15. The method of claim 9, further comprising determining a concentration of the material in a blender unit having the blender inlet based on the determined rate of bulk material being choke-fed into the blender inlet and a rate of fluid being fed into the blender unit measured by a flowmeter coupled to a fluid inlet flow line into the blender unit.

16. The method of claim 9, further comprising determining a calibration factor of the metering mechanism based at least in part on the rate of bulk material determined to be choke-fed into the blender inlet.

17. The system of claim 7, wherein the controller is further programmed to determine when the metering mechanism needs to be replaced based on a trend of a changing calibration factor over time.

18. The method of claim 16, further comprising monitoring changes in the calibration factor over time.

19. The method of claim 18, further comprising determining when the metering mechanism needs to be replaced based on a trend of the calibration factor changing over time.

20. A method, comprising:
receiving and holding one or more portable containers of bulk material onto a frame of a portable support structure disposed proximate a blender inlet, wherein the portable support structure comprises at least one sensor disposed in a position to sense an amount of bulk material in the one or more portable containers;
routing bulk material from the one or more portable containers directly into the blender inlet via a choke-feed outlet;
metering bulk material with a metering mechanism disposed at the blender inlet;
determining, via a controller in communication with the at least one sensor, the amount of bulk material contained within the one or more portable containers and a rate of bulk material being routed into the blender inlet and through the metering mechanism; and
calculating, via the controller, a calibration factor for the metering mechanism based at least in part on a measurement from the at least one sensor.

* * * * *